(12) United States Patent
Browne et al.

(10) Patent No.: US 7,309,104 B2
(45) Date of Patent: Dec. 18, 2007

(54) SHAPE MEMORY POLYMER SEAT ASSEMBLIES

(75) Inventors: Alan L. Browne, Grosse Pointe, MI (US); Nancy L. Johnson, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 475 days.

(21) Appl. No.: 11/076,433

(22) Filed: Mar. 9, 2005

(65) Prior Publication Data

US 2005/0218710 A1   Oct. 6, 2005

Related U.S. Application Data

(60) Provisional application No. 60/552,795, filed on Mar. 12, 2004.

(51) Int. Cl.
*A47C 7/46* (2006.01)
(52) U.S. Cl. .............................. 297/284.1; 297/452.28
(58) Field of Classification Search ........... 297/452.28, 297/284.1
See application file for complete search history.

(56) References Cited

U.S. PATENT DOCUMENTS

| | | | |
|---|---|---|---|
| 5,128,197 A | | 7/1992 | Kobayashi et al. |
| 5,142,757 A | * | 9/1992 | Thary .................... 297/452.58 |
| 5,176,424 A | * | 1/1993 | Tobita et al. ............ 297/284.1 |
| 5,669,094 A | | 9/1997 | Swanson |
| 5,855,415 A | | 1/1999 | Lilley, Jr. et al. |
| 6,653,363 B1 | | 11/2003 | Tursi, Jr. et al. |
| 6,720,402 B2 | | 4/2004 | Langer et al. |
| 6,910,714 B2 | * | 6/2005 | Browne et al. ............. 280/753 |
| 2005/0217767 A1 | * | 10/2005 | Barvosa-Carter et al. ... 148/563 |
| 2006/0033312 A1 | * | 2/2006 | Barvosa-Carter et al. ....................... 280/728.1 |

FOREIGN PATENT DOCUMENTS

EP   1420624 A2  *  5/2004

* cited by examiner

*Primary Examiner*—Anthony D. Barfield

(57) ABSTRACT

A seat assembly includes a seat fabric, wherein at least a portion of the seat fabric comprises a yarn comprising a shape memory polymer adapted to undergo a change in a modulus of elasticity at a thermal transition temperature; a support material upon which the seat fabric is disposed; and a controller in operative communication with the shape memory polymer, wherein the controller is operable to selectively apply a thermal activation signal to the shape memory polymer to effect a change in the modulus of elasticity of the shape memory polymer, wherein the change in the modulus of elasticity of the shape memory polymer results in a change in a stiffness and/or flexibility of the seat fabric.

20 Claims, 1 Drawing Sheet

SHAPE MEMORY POLYMER SEAT ASSEMBLIES

CROSS REFERENCE TO RELATED APPLICATIONS

The present application relates to, and claims priority to, U.S. Provisional Patent Application No. 60/552,795, which was filed on Mar. 12, 2004 and is incorporated herein in its entirety.

BACKGROUND

The present disclosure generally relates to seat fabrics and, more particularly, to seat fabrics based on shape memory polymers.

Motor vehicle seats commonly include controls with which the vehicle driver can adjust various features (e.g., positional location, recline angle, lumbar support, leg support, seat bottom angle, and the like) of the seat. The features of these seats can be adjusted either manually (e.g., by means of lever mechanisms), or automatically (e.g., using electro-mechanical remote controllers, switches, buttons, key fobs, and the like). While a seat assembly incorporating automatic feature adjustment means may be more convenient, less labor intensive, and more precise in control, an actuator is necessary to permit adjustment of the particular seat feature. Current actuators may have high part counts, loud motors, complex circuitry; may cause electromagnetic field (EMF) interference; and may be expensive to fabricate.

There accordingly remains a need in the art for new and improved seat assemblies. It would be particularly desirable if these seat assemblies provided the advantages of automatic feature control relative to manual feature control while simultaneously offering performance advantages (e.g., fewer parts, quieter, simpler in design, less or no EMF interference, and/or less expensive to manufacture) over existing automatic seat assemblies.

Regardless of how the features of a vehicle seat(s) are adjusted, it may be quite difficult to precisely tune the seat shape (i.e., seat contour) as desired by a vehicle user because each aspect of a seat's shape generally requires a separate individual control device. For example, there are separate control devices for lumbar support, leg support, and seat bottom angle. Therefore, new and improved seat assemblies, such as those contemplated above, would be further advantageous if the ability to variably control the seat shape were provided such that individual controls for each aspect of the seat shape were not required.

BRIEF SUMMARY

A seat assembly includes a seat fabric, wherein at least a portion of the seat fabric comprises a yarn comprising a shape memory polymer adapted to undergo a change in a modulus of elasticity at a thermal transition temperature; a support material upon which the seat fabric is disposed; and a controller in operative communication with the shape memory polymer, wherein the controller is operable to selectively apply a thermal activation signal to the shape memory polymer to effect a change in the modulus of elasticity of the shape memory polymer, wherein the change in the modulus of elasticity of the shape memory polymer results in a change in a stiffness and/or flexibility of the seat fabric.

A method comprises contacting a seat user with a seat fabric of a seat assembly, wherein at least a portion of the seat fabric is woven from a yarn comprising a shape memory polymer; heating the shape memory polymer of the yarn to a thermal transition temperature effective to undergo a change in a modulus of elasticity at the thermal transition temperature, wherein the change in the modulus of elasticity results in a change in the stiffness and/or flexibility of the seat fabric; and cooling the shape memory polymer of the yarn below the thermal transition temperature effective to change a shape of the seat assembly, or maintaining the shape memory polymer of the yarn at or above the thermal transition temperature effective to change a compliance of the seat assembly.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
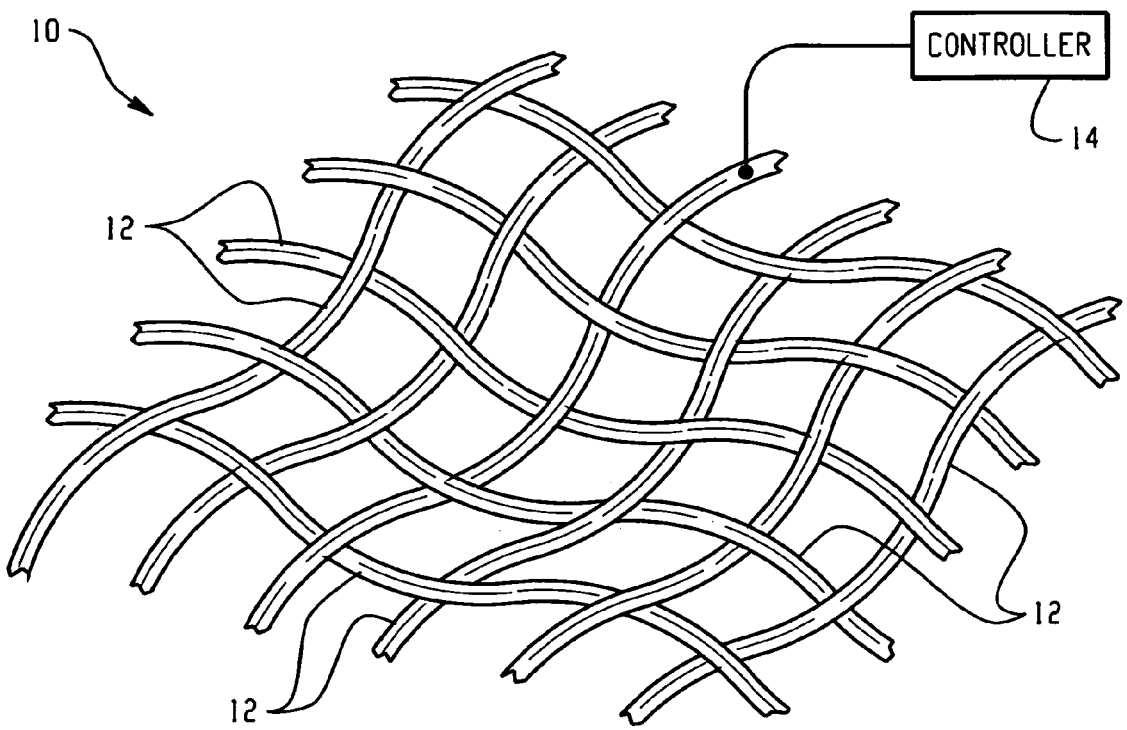
FIG. 1 is a schematic representation of a section of a seat fabric according to one embodiment.

Disclosed herein are seat assemblies and methods for use in any application wherein control of a seat shape and/or compliance is desired. In contrast to the prior art, the seat assemblies and methods disclosed herein are advantageously based on shape memory polymers (SMPs). As used herein, the term "shape memory polymer" generally refers to a polymeric material, which exhibits a change in a property, such as an elastic modulus, a shape, a dimension, a shape orientation, or a combination comprising at least one of the foregoing properties upon application of a thermal activation signal.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced items. Furthermore, all ranges disclosed herein are inclusive of the endpoints and independently combinable.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n-1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be shaped. A permanent shape for the SMP can be set or memorized by subsequently cooling the SMP below that temperature. As used herein, the terms "original shape", "previously defined, shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature with the load removed. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent from the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 40° C. Another temperature for shape recovery may be greater than or equal to about 100° C. Another temperature for shape recovery may be less than or equal to about 250° C. Yet another temperature for shape recovery may be less than or equal to about 200° C. Finally, another temperature for shape recovery may be less than or equal to about 150° C.

The shape memory polymer may be heated by any suitable means. For example, for elevated temperatures, heat may be supplied using hot gas (e.g., air), steam, hot liquid, or electrical current. The activation means may, for example, be in the form of heat conduction from a heated element in contact with the shape memory polymer, heat convection from a heated conduit in proximity to the thermally active shape memory polymer, a hot air blower or jet, microwave interaction, resistive heating, and the like. In the case of a temperature drop, heat may be extracted by using cold gas, evaporation of a refrigerant, thermoelectric cooling, or by simply removing the heat source for a time sufficient to allow the shape memory polymer to cool down via thermodynamic heat transfer. The activation means may, for example, be in the form of a cool room or enclosure, a cooling probe having a cooled tip, a control signal to a thermoelectric unit, a cold air blower or jet, or means for introducing a refrigerant (such as liquid nitrogen) to at least the vicinity of the shape memory polymer.

In one embodiment, the seat assembly includes a seat fabric and a support material (e.g., foam, metal, wood, and the like), upon which the seat fabric is disposed. The seat fabric comprises a shape memory polymer that has a selected thermal transition temperature at which it undergoes a change in its modulus of elasticity. The shape memory polymer can be formed into a strand, thin strip, ribbon, and the like, of a yarn from which the seat fabric is made. FIG. 1 illustrates a portion of an exemplary seat fabric structure 10. The seat fabric 10 includes a piece (i.e., strand, thin strip, ribbon, and the like) of SMP yarn 12, which can be woven together, in any weave pattern or configuration, with another piece of SMP yarn 12 to form the seat fabric 10. Alternatively, the piece of SMP yarn 12 can be woven together, in any weave pattern or configuration, with a piece of non-SMP yarn (not shown) to form the seat fabric 10. In another embodiment, the pieces of SMP yarn 12 may be non-woven and simply in a parallel or crossing pattern (not shown). The seat assembly further includes a controller 14 in operable communication with the SMP. The controller 14 is operable to selectively apply the activation signal (i.e., heat) to at least a portion of the SMP to effect the change in the modulus of elasticity, which enables the seat fabric 10 to undergo a change in its compliance and/or shape. In one embodiment, the change in compliance and/or shape is reversible.

In one embodiment, the seat fabric 10 may be the exposed surface of the seat assembly. In another embodiment, the seat fabric 10 may be covered by a layer of leather, vinyl, other type of fabric, or the like, which serves as the exposed surface onto which a seat user will sit. Furthermore, the SMP yarn 12, whether in woven or non-woven form, may span the full area of a seat bottom, seat back, seat headrest, seat arm rest, and the like, or may be located in portions thereof.

Figure 2:
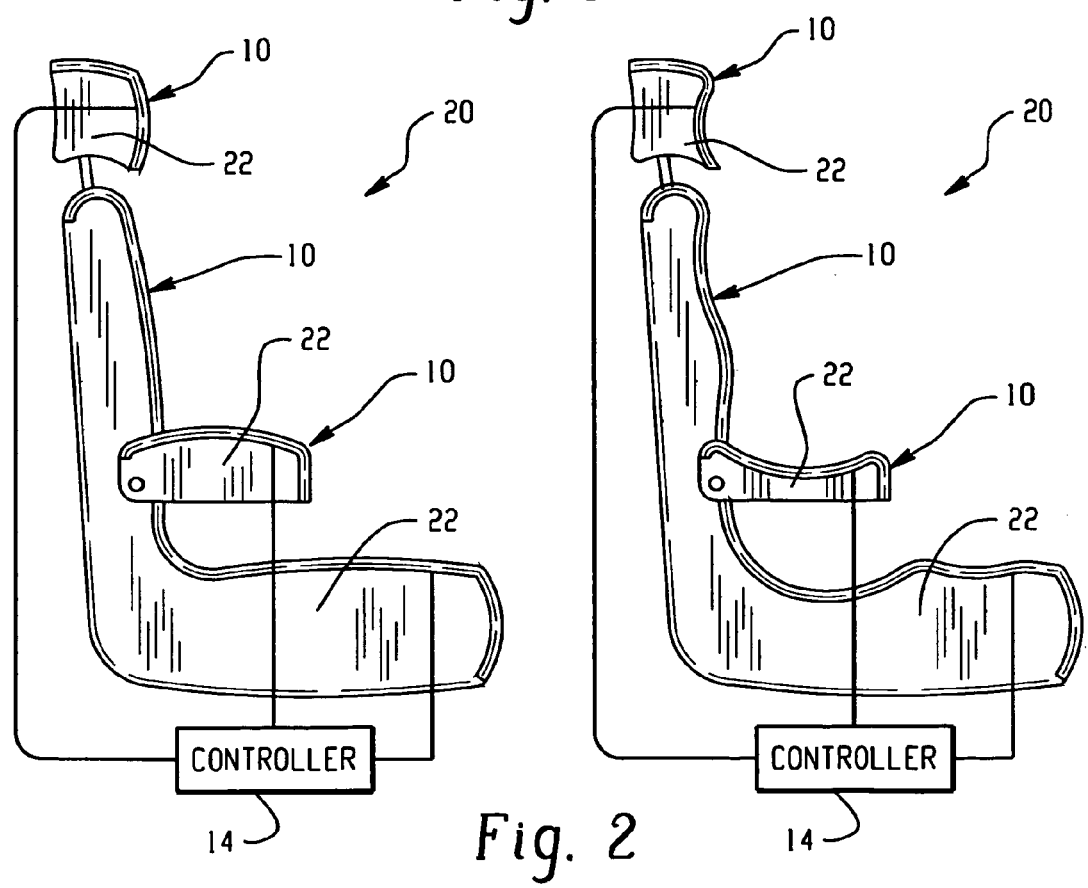
FIG. 2 is a schematic representation of a seat assembly before and after seat shape adjustment.

FIG. 2 illustrates an exemplary seat assembly 20 before and after shape adjustment. The seat assembly 20 has a first or rest shape prior to a seat user occupying the seat assembly 20. Once a seat user (not shown) occupies the seat assembly 20 such that a portion of the seat user contacts the seat fabric 10, either directly or indirectly (e.g., the seat user contacts a leather, vinyl, fabric, or the like exterior surface layer (not shown) covering the seat fabric 10) a distortion in the shape of the seat assembly 20 occurs owing to the weight of the seat user. The support material 22 provides a resistive force opposite in direction to the force caused by the weight of seat user occupying the seat assembly 20. However, owing to this resistive force, prolonged occupation of the seat assembly 20 may lead to discomfort or sore spots.

To avoid discomfort or sore spots, the shape of the seat assembly 20 can be adjusted to the shape of the seat user. To adjust the seat shape, the controller 14 applies heat to at least a portion of the SMP in the seat fabric 10 to increase the temperature of the SMP to the thermal transition temperature. At the thermal transition temperature, which is desirably greater than the temperature of the seat user, the SMP experiences a decrease in the modulus of elasticity, which consequently decreases the stiffness and/or increases the flexibility of the seat fabric 10. Subsequent cooling of the SMP to a temperature below the thermal transition temperature, while under the load resulting from the weight of the seat user, sets a new or adjusted shape of the seat assembly 20. This adjustment in the shape of the seat assembly 20 effectively decreases the magnitude of, and/or leads to a more even distribution of, the resistive force created by the support material 22.

In another embodiment, the stiffness or compliance of the seat assembly 20 can be adjusted by the seat user. To adjust the compliance of the entire seat assembly 20, or portions thereof, the controller 14 applies heat to at least a portion of the SMP in the seat fabric 10 to increase the temperature of the SMP to the thermal transition temperature. The controller 14 may be configured to activate (i.e., heat) various regions of the seat fabric 10, such that the compliance can be tuned over a wide range to that desired by the seat user. Alternatively, the seat fabric 10 may comprise SMPs of different thermal transition temperatures. In this manner, depending on the temperature to which the seat fabric 10 is heated, selected portions of the seat assembly 20 will have a stiffness changed. Desirably, the activation is then maintained until the compliance-selecting feature of the controller 14 is discontinued (e.g., when the controller 14 is turned off, the vehicle is turned off, the seat assembly 20 is unoccupied for a selected period of time, and the like).

In one embodiment, the support material 22 comprises a shape memory polymer. The shape memory polymer of the support material 22 may be in the form of a solid, a foam, a non-foam solid with cavities or holes either molded or machined therein, a lattice structure, and the like). The shape memory polymer of the support material 22 may be in operative communication (not shown) with the controller 14, which may selectively apply the activation signal to the shape memory polymer of the support material 22. Alternatively, thermodynamic heat transfer from the seat fabric 10 to the support material 22 acts as the activation signal for the shape memory polymer of the support material 22. In this manner, the shape and/or compliance of the seat assembly 20 can be variably tuned by adjusting the both the shape/compliance of the support material 22 and those of the seat fabric 10.

If a one-way shape memory polymer is used to form the yarn (and optionally the support material 22), then the seat assembly 20 can be returned to its original shape by heating the yarn (and the support material 22) to a temperature above the thermal transition temperature without subjecting the yarn (and the support material 22) to a load or stress. In this manner, the seat assembly 20 can be repeatedly reshaped.

If a two-way shape memory polymer is used to form the yarn (and optionally the support material 22), then the seat assembly 20 will return to its original shape and/or compliance upon discontinuation of the activation signal if there is no load or stress applied to the SMP of the yarn (and the support material 22). Discontinuation of the activation signal comprises the SMP of the yarn (and the support material 22) attaining a temperature below the thermal transition temperature that was attained during the shape and/or compliance change.

In one embodiment, the seat assembly is used in a motor vehicle and may be a driver's seat or a passenger's (front and/or rear) seat. The shape and/or compliance of the seat assembly may be changed the first time a seat user (i.e., driver and/or passenger) occupies the seat assembly and/or each time a different seat user occupies the seat assembly. In one embodiment, the shape of the seat assembly may remain in a particular (temporary) shape until it has been reshaped to a new (temporary) shape. Similarly, the compliance may remain at a particular (temporary) level until the compliance setting is changed. Alternatively, the shape and/or compliance of the seat assembly may be changed to its original shape/compliance level once the seat user no longer occupies the seat assembly.

In one embodiment, the shape and/or compliance of the seat assembly may be changed once and never changed again. This type of single-use shape and/or compliance change may be particularly useful in applications wherein a vehicle occupant wants a custom-shaped and/or stiffness seat or where only one seat user will ever occupy the seat assembly (e.g., a vehicle intended for competitive racing).

If the motor vehicle seat assembly includes a seat heater, then the thermal transition temperature will be above the maximum temperature attainable by the seat heater. In this manner, the shape and/or compliance of the seat assembly may not be changed each time the seat heater is activated and/or reaches maximum temperature.

If the seat assembly comprises a seat back, seat cushion, head rest, arm rests, and/or other elements, the controller may be in operative communication with each of these elements of the seat assembly. In this manner, the shape and/or compliance of all seat elements may advantageously be changed by a single control device.

Although reference has been made herein to motor vehicle applications, it is contemplated that the seat assemblies may be employed in any application wherein control of a seat shape and/or compliance is desired. In one such example, the seat assembly may be used in a domestic furniture piece (e.g., sofa, couch, recliner, chair, and the like).

Suitable polymers for use in the SMPs include thermoplastics, thermosets, interpenetrating networks, semi-interpenetrating networks, or mixed networks of polymers. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsesquioxane), polyvinyl chloride, urethane/butadiene copolymers, polyurethane block copolymers, styrene-butadiene-styrene block copolymers, and the like, and combinations comprising at least one of the foregoing polymer components. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). The polymer(s) used to form the various segments in the SMPs described above are either commercially available or can be synthesized using routine chemistry. Those of skill in the art can readily prepare the polymers using known chemistry and processing techniques without undue experimentation.

Advantageously, the above noted seat assemblies provide a reversible means of controlling the shape and/or compliance of the seat assembly. In addition to providing reversibility, it should be recognized by those skilled in the art that the SMP-based seat assemblies as disclosed herein do not require motors. Furthermore, it should be recognized by those skilled in the art that each aspect of the seat shape and/or compliance does not necessarily require a separate control device in these seat assemblies. Since motors and/or individual controls for adjusting each aspect of the seat shape and/or compliance are not necessarily utilized, the seat assembly can be less expensive, quieter, more lightweight, and/or less interfering than existing seat assemblies.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A seat assembly, comprising:
   a seat fabric, wherein at least a portion of the seat fabric comprises a yarn comprising a shape memory polymer adapted to undergo a change in a modulus of elasticity at a thermal transition temperature;
   a support material upon which the seat fabric is disposed; and
   a controller in operative communication with the shape memory polymer, wherein the controller is operable to selectively apply a thermal activation signal to the shape memory polymer to effect a change in the modulus of elasticity of the shape memory polymer, wherein the change in the modulus of elasticity of the shape memory polymer results in a change in a stiffness and/or flexibility of the seat fabric.

2. The seat assembly of claim 1, wherein the change in the stiffness and/or flexibility of the seat fabric results in a change in a shape of the seat assembly.

3. The seat assembly of claim 2, wherein the change in the shape of the seat assembly is reversible.

4. The seat assembly of claim 1, wherein the change in the stiffness and/or flexibility of the seat fabric results in a change in a compliance of the seat assembly.

5. The seat assembly of claim 4, wherein the change in the compliance of the seat assembly is reversible.

6. The seat assembly of claim 1, wherein the yarn comprises a strand, strip, ribbon, or a combination comprising at least one of the foregoing, of the shape memory polymer.

7. The seat assembly of claim 1, wherein the at least the portion of the seat fabric comprises a plurality yarns, wherein each of the plurality of yarns comprises a shape memory polymer, wherein each shape memory polymers is adapted to undergo a change in a modulus of elasticity at a thermal transition temperature.

8. The seat assembly of claim 7, wherein each shape memory polymer of each of the plurality of yarns has a different thermal transition temperature.

9. The seat assembly of claim 1, wherein the seat assembly is used in a motor vehicle.

10. The seat assembly of claim 1, wherein the support material comprises a shape memory polymer adapted to undergo a change in a modulus of elasticity at the thermal transition temperature.

11. The seat assembly of claim 10, wherein the shape memory polymer of the support material may be a solid, foam, non-foam solid comprising a cavity or hole, a lattice structure, or a combination comprising at least one of the foregoing.

12. The seat assembly of claim 10, wherein the shape memory polymer of the support material is in operative communication with the controller.

13. The seat assembly of claim 10, wherein thermodynamic heat transfer from the seat fabric to the shape memory polymer of the support material results in the change in the modulus of elasticity of the shape memory polymer of the support material.

14. The seat assembly of claim 1, wherein the seat fabric is covered by a layer of leather, vinyl, other fabric, or a combination comprising at least one of the foregoing.

15. The seat assembly of claim 1, wherein the seat assembly comprises a seat back seat bottom, seat headrest, seat armrest, or a combination comprising at least one of the foregoing.

16. The seat assembly of claim 1, wherein the seat assembly is a motor vehicle seat assembly.

17. A method, comprising:
   contacting a seat user with a seat fabric of a seat assembly, wherein at least a portion of the seat fabric is woven from a yarn comprising a shape memory polymer;
   heating the shape memory polymer of the yarn to a thermal transition temperature effective to undergo a change in a modulus of elasticity at the thermal transition temperature, wherein the change in the modulus of elasticity results in a change in the stiffness and/or flexibility of the seat fabric; and cooling the shape memory polymer of the yarn below the thermal transition temperature effective to change a shape of the seat assembly, or maintaining the shape memory polymer of the yarn at or above the thermal transition temperature effective to change a compliance of the seat assembly.

18. The method of claim 17, further comprising heating a shape memory polymer of a support material to the thermal transition temperature effective to undergo a change in a modulus of elasticity of the shape memory polymer of the support material at the thermal transition temperature, wherein the change in the modulus of elasticity results in a change in the stiffness and/or flexibility of the support material.

19. The method of claim 17, further comprising cooling the shape memory polymer of the support material below the thermal transition temperature effective to change the shape of the seat assembly, or maintaining the shape memory polymer of the support material at or above the thermal transition temperature effective to change the compliance of the seat assembly.

20. The method of claim 17, wherein the contacting the seat user with the seat fabric of the seat assembly comprises indirect contacting such that a layer of a leather, vinyl, other fabric, or a combination comprising at least one of the foregoing, covers the seat fabric and the seat user directly contacts the layer.

* * * * *